US009273983B2

(12) United States Patent
Sonderegger

(10) Patent No.: US 9,273,983 B2
(45) Date of Patent: *Mar. 1, 2016

(54) SYSTEM AND METHOD OF HIGH VOLUME IMPORT, VALIDATION AND ESTIMATION OF METER DATA

(71) Applicant: Itron, Inc., Liberty Lake, WA (US)

(72) Inventor: Robert C. Sonderegger, Berkeley, CA (US)

(*) Notice: Subject to any disclaimer, the term of this patent is extended or adjusted under 35 U.S.C. 154(b) by 166 days.

This patent is subject to a terminal disclaimer.

(21) Appl. No.: 14/223,467

(22) Filed: Mar. 24, 2014

(65) Prior Publication Data

US 2014/0257757 A1    Sep. 11, 2014

Related U.S. Application Data

(63) Continuation of application No. 12/268,660, filed on Nov. 11, 2008, now Pat. No. 8,730,056.

(51) Int. Cl.
| | |
|---|---|
| *G08C 15/06* | (2006.01) |
| *G08C 23/00* | (2006.01) |
| *G01D 4/02* | (2006.01) |
| *G06Q 10/06* | (2012.01) |
| *G08B 19/00* | (2006.01) |

(52) U.S. Cl.
CPC . *G01D 4/02* (2013.01); *G06Q 10/06* (2013.01)

(58) Field of Classification Search
CPC ................................. G01D 4/02; G06Q 10/06
USPC ........................................ 340/870.02, 870.11
See application file for complete search history.

(56) References Cited

U.S. PATENT DOCUMENTS

| | | | |
|---|---|---|---|
| 4,302,750 A | 11/1981 | Wadhwani et al. | |
| 4,352,164 A | 9/1982 | Reed et al. | |

(Continued)

FOREIGN PATENT DOCUMENTS

| | | |
|---|---|---|
| CA | 2303064 | 3/2000 |
| CA | 2459566 | 3/2004 |

(Continued)

OTHER PUBLICATIONS

Peterson, W., W. and Brown, D.T., Cyclic Codes for Error Detection, Proceedings of the IRE 49(I), pp. 228-235, Jan. 1961.

(Continued)

*Primary Examiner* — Thienvu Tran
*Assistant Examiner* — Lucy Thomas

(57) ABSTRACT

A meter data management system includes one or more application servers configured to receive, validate and estimate received meter data. The one or more application servers may include various memory/media elements for storing raw and transformed meter data as well as software in the form of computer-executable instructions, which are executed by a processor to implement a variety of functions, including establishing a mapping between the plurality of external devices and a plurality of preconfigured processing workbins (e.g., collections of meter channels in the same time zones), transforming the received meter data into a plurality of data files identified by timing parameter and workbin, validating data provided in each data file, estimating missing or invalid data, and automatically writing validated (and optionally estimated) data as import files to a database server. Such clean data files are then imported to one or more dedicated databases installed on the database server.

8 Claims, 9 Drawing Sheets

(56) References Cited

U.S. PATENT DOCUMENTS

| | | |
|---|---|---|
| 4,757,456 A | 7/1988 | Benghiat |
| 5,194,860 A | 3/1993 | Jones et al. |
| 5,270,704 A | 12/1993 | Sosa Quintana et al. |
| 5,278,551 A | 1/1994 | Wakatsuki et al. |
| 5,305,295 A | 4/1994 | Chu |
| 5,369,691 A | 11/1994 | Cain |
| 5,617,084 A | 4/1997 | Sears |
| 5,897,607 A | 4/1999 | Jenney et al. |
| 6,006,212 A | 12/1999 | Schleich et al. |
| 6,014,089 A | 1/2000 | Tracy et al. |
| 6,088,659 A | 7/2000 | Kelley et al. |
| 6,246,677 B1 | 6/2001 | Nap et al. |
| 6,300,881 B1 | 10/2001 | Yee et al. |
| 6,363,057 B1 | 3/2002 | Ardalan et al. |
| 6,393,341 B1 | 5/2002 | Lawrence et al. |
| 6,396,839 B1 | 5/2002 | Ardalan et al. |
| 6,452,505 B1 | 9/2002 | Taglioni |
| 6,657,549 B1 | 12/2003 | Avery et al. |
| 6,657,552 B2 | 12/2003 | Belski et al. |
| 6,778,099 B1 | 8/2004 | Meyer et al. |
| 6,885,309 B1 | 4/2005 | Van Heteren |
| 6,954,072 B1 | 10/2005 | Schlapp et al. |
| 6,996,215 B2 | 2/2006 | MacConell |
| 7,109,882 B2 | 9/2006 | Angelis et al. |
| 7,283,062 B2 | 10/2007 | Hoiness et al. |
| 7,362,236 B2 | 4/2008 | Hoiness |
| 7,400,264 B2 | 7/2008 | Boaz |
| 7,440,906 B1 | 10/2008 | Wetzer et al. |
| 7,557,729 B2 | 7/2009 | Hubbard et al. |
| 8,174,405 B2 | 5/2012 | Edwards et al. |
| 2002/0010615 A1 | 1/2002 | Jacobs |
| 2002/0188702 A1 | 12/2002 | Short et al. |
| 2003/0040844 A1 | 2/2003 | Spool et al. |
| 2003/0063723 A1 | 4/2003 | Booth et al. |
| 2003/0204756 A1 | 10/2003 | Ransom et al. |
| 2003/0235194 A1 | 12/2003 | Morrison |
| 2004/0019518 A1 | 1/2004 | Abraham et al. |
| 2004/0030745 A1 | 2/2004 | Boucher et al. |
| 2004/0093209 A1 | 5/2004 | Okutani |
| 2004/0236620 A1 | 11/2004 | Chauhan et al. |
| 2005/0020232 A1 | 1/2005 | Bonicatto et al. |
| 2005/0023347 A1 | 2/2005 | Wetzel et al. |
| 2005/0068194 A1 | 3/2005 | Schleich et al. |
| 2005/0192999 A1 | 9/2005 | Cook et al. |
| 2005/0222933 A1 | 10/2005 | Wesby |
| 2005/0267898 A1 | 12/2005 | Simon et al. |
| 2005/0268341 A1 | 12/2005 | Ross |
| 2007/0001868 A1 | 1/2007 | Boaz |
| 2007/0013549 A1 | 1/2007 | Schleich et al. |
| 2007/0043849 A1 | 2/2007 | Lill |
| 2008/0026780 A1 | 1/2008 | Hart et al. |
| 2008/0040025 A1 | 2/2008 | Hoiness |
| 2008/0048883 A1 | 2/2008 | Boaz |
| 2008/0218378 A1 | 9/2008 | Bakken et al. |

FOREIGN PATENT DOCUMENTS

| | | |
|---|---|---|
| CA | 2485593 | 1/2006 |
| CA | 2644420 | 1/2006 |
| EP | 1265450 A2 | 12/2002 |
| GB | 2356475 | 5/2001 |
| WO | WO 00/02371 | 1/2000 |
| WO | WO 01/35366 | 5/2001 |

OTHER PUBLICATIONS

LookSmart's FindArticles, "BC Gas Selects Utility Partner's MobileUP Solution For Workforce Automation," Business Wier, Jun. 19, 2000, pp. 1-2, http://www.findarticles.com/p/articles/mi_M0EIN/is_2000_June_19/ai_62815236/print, [Accessed on Oct. 21, 2004].

TRACE® Automated Meter Reading System Operation Brief, BadgerMeter, Inc., Milwaukee, WI, 2001, 2 pages.

DB Microware, "DB Microware Wins 2004 iAnywhere Innovator Award," DB Microware Fieldnet Family, 2001, pp. 1-2, http://www.dbmicro.com/Fieldnet.htm, [Accessed Oct. 21, 2004].

Badger Meter, Inc., "TRACE® Automated Meter Reading System, Operation Brief," Milwaukee, WI, Dec. 2001, 2 pages.

BadgerMeter, Inc., "TRACE® Automated Meter Reading System, Model MMI Mini Mobile Interrogator, Technical Brief," Milwaukee, WI, Dec. 2001, 2 pages.

BadgerMeter, Inc., "TRACE® Automated Meter Reading System, Vehicle Interactive Display (VID), Technical Brief," Milwaukee, WI, Jun. 2002, 1 page.

AMCO Automated Systems, LLC, "Vehicular Interactive Display (a Mini Mobile Interrogator option)," Scott Depot, WV, Sep. 2002, 2 pages.

Mobile Collector 2.0 User's Guide, Itron, Inc., Spokane, WA, 2003, pp. i-84.

Mobile Collector 2.0 Administration Guide, Itron, Inc., Spokane, WA, 2003, pp. i-78.

AMCO Automated Systems, LLC, "TRACE Automated Meter Reading Systems, TRACE™ VRT™—mobile AMR system," Scott Depot, WV, Apr. 2003, 2 pages.

"Magellan RoadMate 700 (North America)," Thales Navigation, Inc., 2004 http://www.magellangps.com/en/products/product.asp?PRODID=955, 3 pages, Internet accessed on Oct. 27, 2004.

U.S. Appl. No. 10/971,720, filed Oct. 21, 2004.

Non-Final Office Action for U.S. Appl. No. 10/971,720, mailed Apr. 21, 2009, 13 pages.

CA Patent Application No. 2 485 595—Mar. 1, 2010 Office Action.

Office Action for U.S. Appl. No. 13/091,298 mailed Sep. 25, 2012.

Office Action for U.S. Appl. No. 10/971,720 mailed Oct. 3, 2012.

Non-Final Office Action mailed May 5, 2008, for U.S. Appl. No. 10/971,720, 20 pages.

Final Office Action mailed Feb. 24, 2010, for U.S. Appl. No. 10/971,720, 18 pages.

Non-Final Office Action mailed Mar. 16, 2011, for U.S. Appl. No. 10/971,720, 11 pages.

Non-Final Office Action mailed Aug. 25, 2011, for U.S. Appl. No. 10/971,720, 13 pages.

Final Office Action mailed Jan. 24, 2012, for U.S. Appl. No. 10/971,720, 15 pages.

Final Office Action mailed Feb. 4, 2013, for U.S. Appl. No. 10/971,720, 18 pages.

Final Office Action mailed Mar. 12, 2013, for U.S. Appl. No. 13/091,298, 13 pages.

Non-Final Office Action mailed Aug. 28, 2013, for U.S. Appl. No. 13/091,298, 18 pages.

SYSTEM AND METHOD OF HIGH VOLUME IMPORT, VALIDATION AND ESTIMATION OF METER DATA

This application is a continuation application of U.S. patent application Ser. No. 12/268,660, filed Nov. 11, 2008, entitled "SYSTEM AND METHOD OF HIGH VOLUME IMPORT, VALIDATION AND ESTIMATION OF METER DATA" which is incorporated herein by reference for all purposes.

FIELD OF THE INVENTION

The present subject matter relates to utility meters. More particularly, the present technology relates to meter data management systems and methodologies for improving the collection of high volume amounts of data from a large number of utility meters in an open operational framework, including such specific steps of importing, validating, and estimating data.

BACKGROUND OF THE INVENTION

The general object of metrology is to monitor one or more selected physical phenomena to permit a record of monitored events. Such basic purpose of metrology can be applied to a variety of metering devices used in a number of contexts. One broad area of measurement relates, for example, to utility meters, which monitor the consumption or production of a variety of forms of energy or other commodities, such as but not limited to, electricity, water, gas, or oil. A typical utility provider (e.g., gas utility, water utility, electrical utility, etc.) is often responsible for managing multiple meters that provide information about utility usage by its customers.

Different forms of utility meters have been utilized over the years, lending the meter data gathering process to accommodate a variety of meter types and monitored data parameters. For example, conventional mechanical forms of registers are generally capable of basic monitoring of accumulated kilowatt-hour consumption of a commodity. Solid state devices and other electronic forms of metrology devices generally permit relatively higher levels of monitoring, involving different forms and modes of data, such as rate of electricity consumption, or date and time of consumption (so-called "time of use" data), as well as register, interval, tamper, outage and meter event data.

Additional changes to metering devices have developed due to relatively recent advancements arising as part of the so-called "Advanced Metering Initiative" or "Advanced Metering Infrastructure" (AMI) technologies. As defined by the Federal Energy Regulatory Commission (FERC), advanced metering generally involves metering systems that record customer consumption and possibly other parameters hourly or more frequently and that provides for daily or more frequent transmittal of measurements over a communication network to a central collection point. As such, recent technological changes to utility meters have included adapting such devices and their associated communications infrastructure to accommodate advanced metering techniques, thus yielding "smart" utility meter devices. Such devices may be capable of transmitting data in accordance with more advanced one-way or two-way communication protocols, such as but not limited to wired transmissions, data output via radio frequency transmission, pulse output of data, and telephone line connection via modem, cellular linkups, Bluetooth networks or others.

Data management issues in the utility metering context relate not only to different types of meter devices and communication protocols, but also to the coordination of different types of data gathering tasks, such as meter reading and meter servicing. Meters are typically read and/or serviced on a periodic basis. For example, the utility provider may schedule its meters for reading or servicing on a monthly basis, on an annual basis, or as otherwise needed. Often, the utility provider groups its meters into meter reading routes (for example, such as with each route potentially consisting of a group of meters within a given geographical area).

Existing meter management systems often dictate that utility providers handle meter reading events separately from meter servicing events and other utility servicing events. For example, a meter reading technician may handle meter reading events on a route, while a meter servicing technician may separately handle meter servicing events on the same route. In addition, an infrastructure technician may handle servicing of associated utility infrastructure (e.g., meter connections, transmission components, etc.).

To facilitate meter reading and servicing, utility providers may implement a variety of meter management techniques such as electronic meter reading (EMR), off-site meter reading (OMR), or automatic meter reading (AMR), some or all of which may include computerized or automated functionality. Because utility providers may employ more than one meter management technique within a single utility system, handling meter reading and meter servicing events becomes even more complex.

For example, with EMR, handheld computers or similar devices with integrated meter reading software may be used to capture and store meter reading data from electric, gas, or water meters. Additionally, EMR systems may collect non-meter reading information, including meter condition, hazardous conditions, tamper information, survey data, and high/low reading checks.

In one exemplary arrangement with EMR, a meter reader may walk (or intermittently ride) a specified route, visually reading meters, and entering meter reading data into a handheld computer or other appropriate device. The meter reading data is recorded and stored in the handheld computer or device. The meter reading data is eventually transferred to a host processor, which then transfers the data to a utility billing system, etc. EMR systems can also incorporate readings gathered by probing meters, as is the case with time-of-use meters and interval data recorders. EMR systems can also probe water meters using inductive probes, etc.

OMR may use such as radio-equipped handheld computers to read module-equipped electric, gas, or water meters via radio. Such approach enables the meter to be read without directly accessing the meter or the premise.

For example, with OMR, as a meter reader walks a route, the radio-equipped handheld computer sends a radio "wake-up" signal to nearby radio-based meter modules installed on electric, gas or water meters. OMR may also use bubble up techniques where the radio-based meter modules send the information at some configurable time interval (e.g., every five seconds). The handheld computer then receives meter reading and tamper data back from the meter modules. OMR is often used to read meters within a utility service territory that are otherwise hazardous or costly to read. Such meters may be, for example, typically located in a geographically dispersed environment, for example, scattered throughout the service territory.

Mobile AMR may use, for example, vehicles equipped with radio units to read electric, gas, or water meters (or others) equipped with receiver/transmitter modules. Meter reading can then take place via radio without the need to physically access the meter.

For example, a radio transceiver may be installed in a utility vehicle and route information specified. While being driven along the specified meter reading route, the transceiver may broadcast a radio wake-up signal to all radio-based meter modules within its range and receives messages in response. Completed reads may be uploaded to a billing system. Mobile AMR is often used in saturated areas where there may be difficult-to-access or hazardous-to-read meters or large populations. Like OMR, mobile AMR can use both wakeup and bubble up techniques for transmission of data.

Fixed network AMR typically uses a fixed radio communication network to collect data from electric, gas, or water meters or others equipped with radio-based meter modules. The collected data is transported over a wide-area communication network to a central host processor. Control units installed on power poles or street lights function as neighborhood concentrators that read meter modules, process data into a variety of applications, store data temporarily, and periodically transport data to the host processor.

Fixed network AMR is usually installed over saturated areas where advanced metering data, variable reads, and unscheduled reads are needed. Saturated deployment spreads the cost of the network components over multiple meters.

Given the sharp growth in variety of meter types, data parameters, and data interfacing tasks that occur in a metering environment, it has become inherent that utility companies will often have large-scale requirements for data processing. Utilities will need to be able to collect, validate, import, and process relatively large volumes of data, sometimes gathered from literally hundreds of thousands of individual meter installations, or data points. Such tasks also need to be implemented in a timely and efficient manner, especially where timing requirements are mandated. In some instances, per applicable regulatory requirements or business needs, importation and validation of certain meter data must be completed before the beginning of the business day following consumption of the utility.

In light of the above issues pertaining to meter data, the desire for increased processing capabilities as well as other considerations including, but not limited to, a desire to collect data from a large number of individual metrology components in an open operational framework, leads to requirements for efficiently controlling collection of such data. As such, it is desired to provide improved methodology, and corresponding apparatus, for improving the collection of data from a large number of utility meters in an open operational framework.

While various aspects and alternative embodiments may be known in the field of utility metering, no one design has emerged that generally encompasses the above-referenced characteristics and other desirable features associated with utility metering technology as herein presented.

SUMMARY OF THE INVENTION

In view of the recognized features encountered in the prior art and addressed by the present subject matter, improved methodology and corresponding apparatus allowing efficient collection of high volume amounts of data from a large number of utility meters in an open operational framework, including such specific steps of importing, validating, and estimating data, are provided.

One positive aspect of the present technology relates to the organization of meter channels into so-called workbins (i.e., collections of meter channels in physical or geographic proximity to one another). Because the composition of workbins can be preconfigured and largely fixed, the metadata required for parsing, validating, and estimating incoming data can be pre-assembled from a database in an efficient and asynchronous manner that minimizes database roundtrips and leverages native database engine power. In one example, such metadata and other historic data characterizing prior meter consumption can be uploaded by workbin, so that received meter data for each workbin can be parsed, validated and estimated by workbin to increase system processing efficiency.

Another positive aspect of the present technology in certain embodiments and implementations thereof relates to the breaking up of end-to-end processes into multiple asynchronous processes that act on one workbin at a time as a unit of work. The various asynchronous processes described herein include a receiver service, validation and estimation service, and database import service.

A still further positive aspect of the disclosed subject matter for certain exemplary embodiments concerns extensive use of in-memory data structures comprising entire workbins and ways to minimize unnecessary roundtrips to disk storage and/or databases.

One exemplary present embodiment relates to a method of managing electronic meter data associated with a plurality of external devices, wherein such method may include various steps relating to receiver functionality, validation and estimation functionality, and database import functionality. With regard to exemplary receiver functionality within such a method, a first step may include establishing a mapping between each of a plurality of external devices (e.g., meters, meter channels, intermediate data repositories, etc.) and a number of preconfigured processing groupings called workbins. As part of this mapping, receiver functionality may also serve to resolve external device identifiers into unique internal identifiers, which may be more easily mapped to workbin or other designation.

In the foregoing exemplary embodiment, workbins may be defined in groups, for example a grouping of selected external devices. In one example, such predefined collections of external devices are grouped based on parameters such as but not limited to range(s) of physical or geographic proximity to one another, whether meters are in the same time zone, or the like. Workbin mappings may be stored in a readily accessible data store, such as a hash table, for quick on-site correlation.

Still further, per such exemplary embodiment, meter data from a plurality of meters may be received in various formats and filtered. For example, meter data may be rejected and converted into error files if certain criteria exist, such as the data is received from an invalid external device identifier, contains duplicate data, or has an out-of-range timestamp.

Per certain aspects of practicing the foregoing exemplary embodiment, a final step in the receiver subsystem of steps of such exemplary embodiment may involve transforming the meter data into binary files identified by workbin number and one or more timing parameters (e.g, day and time) on which the meter data was read.

Subsequent steps in the above exemplary embodiment of a method for managing electronic meter data generally may further alternatively involve validation and estimation of data. First, a data readiness parameter may be provided, for example, to identify when 24 hours worth or some other predetermined amount of valid data has been received. After data readiness, or while incoming data is being received, the data may be validated by comparison to historic data in accordance with predetermined rules, for example to ensure that the data falls within certain ranges of acceptable values. If the data is found to be valid, it can be provided in a clean binary format and indicated as ready to import. If data is invalid or missing, an estimation subprocess may be implemented to estimate the missing/invalid data based on prior data for similar timeframes, data correlation between valid endpoints, or other parameters.

Final steps in such exemplary method may involve automatically importing data files with validated (and estimated, if needed) data files as soon as they are ready.

In addition to various methodologies, it is to be understood that the present subject matter equally relates to associated systems, including various hardware components that may be provided in a meter data management system. One exemplary such system may include one or more application servers configured to receive, validate and estimate received meter data, as well as at least one database installed on a database server into which clean binary files are imported.

In variations of the foregoing exemplary arrangement, the one or more application servers may more particularly include a first memory adapted for storing software in the form of computer-executable instructions, a second memory adapted for storing meter data received from a plurality of external devices, and at least one processor coupled to the first and second memories and configured to selectively implement the computer-executable instructions stored in the first memory to selectively process the meter data stored in the second memory. The processor may implement the computer-executable instructions in order to implement a variety of functions, including but not limited to establishing a mapping between the plurality of external devices and a plurality of preconfigured processing workbins, transforming the received meter data into a plurality of data files identified by timing parameter (e.g, date and time) as well as workbin, validating data provided in each data file, estimating missing or invalid data, and automatically writing validated (and optionally estimated) data as import files to a database server. Further, at least one database installed on the database server may be coupled to one or more of the application servers, for importing the validated and estimated data files Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
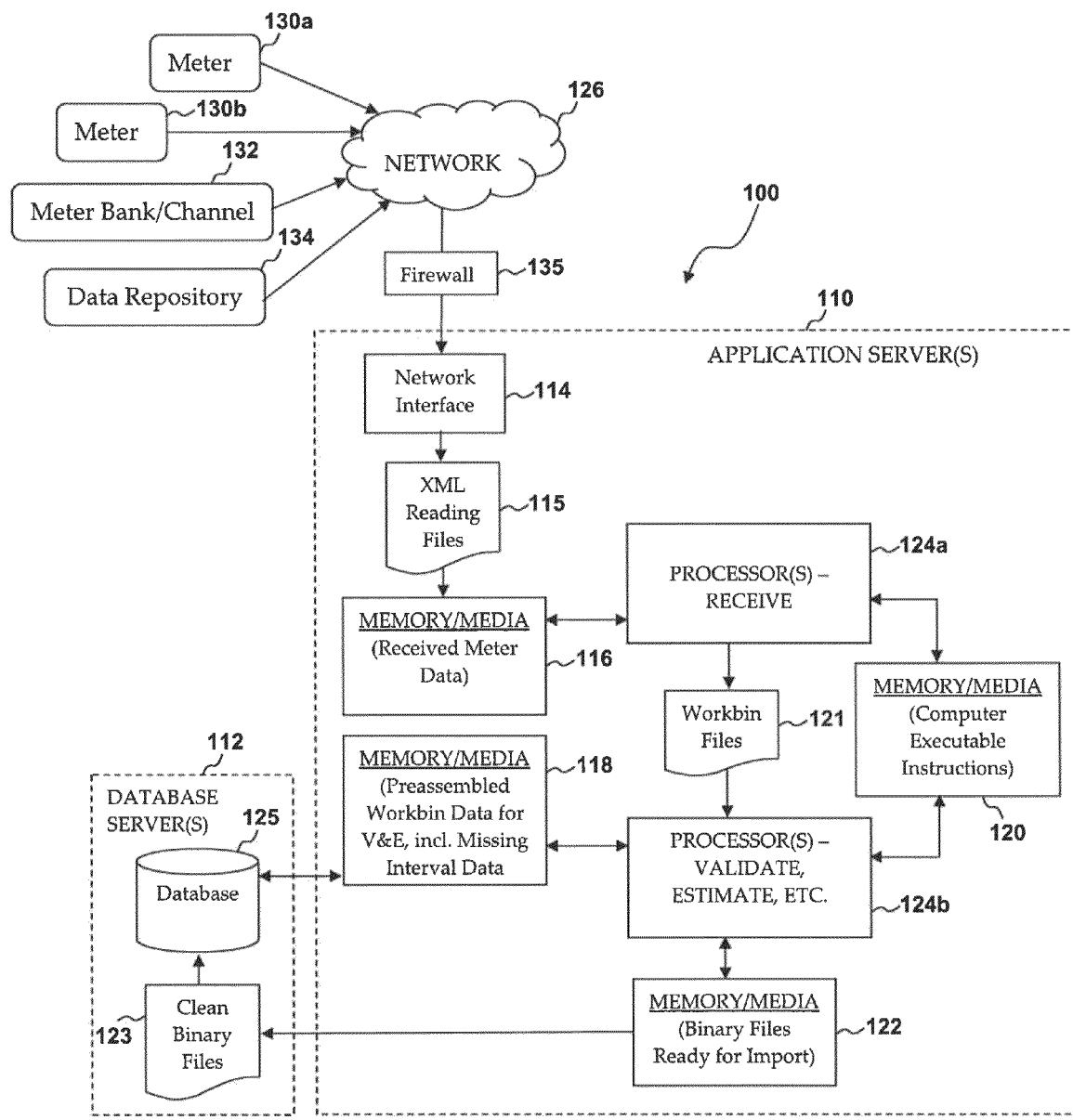
FIG. 1 is a block diagram overview illustration of exemplary hardware components within a meter data management system in accordance with the present subject matter, including various exemplary external metering devices coupled to application and database servers.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with the provision of improved methodology and corresponding systems for electronically managing meter data in an integrated and efficient manner to accommodate high volume receipt, processing and import thereof.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The technology discussed herein makes reference to processors, servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. All such variations as will be understood by those of ordinary skill in the art are intended to come within the spirit and scope of the present subject matter.

When data is obtained or accessed between a first and second computer system or component thereof, the actual data may travel between the systems directly or indirectly. For example, if a first computer accesses a file or data from a second computer, the access may involve one or more intermediary computers, proxies, or the like. The actual file or data may move between the computers, or one computer may provide a pointer or metafile that the second computer uses to access the actual data from a computer other than the first computer, for instance.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality, either complementary or unrelated to the present subject matter. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the methods and systems set forth and disclosed herein may also be implemented by hard-wired logic or other circuitry, including, but not limited to application-specific circuits. Of course, various combinations of computer-executed software and hard-wired logic or other circuitry may be suitable, as well.

It is to be understood by those of ordinary skill in the art that embodiments of the methods disclosed herein may be executed by one or more suitable computing devices. For instance, as noted in further detail below, one or more application servers may comprise one or more processors configured to receive, validate, estimate and import meter data received from a plurality of external devices (e.g., meters, meter channels, data repositories, etc.). Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter.

As will be understood by those of ordinary skill in the art from the disclosure herewith, additionally or alternatively, the computing device(s) may comprise circuitry that renders the device(s) operative to implement one or more of the methods of the present subject matter. Furthermore, components of the presently-disclosed technology, such as storage databases, may be implemented using one or more computer-readable media.

It is to be understood that any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

Reference will now be made in detail to presently preferred exemplary embodiments of the subject methodology and apparatus. Referring to the drawings, FIGS. 1-3, respectively, provide block diagram illustrations of various exemplary aspects of a meter data management system 100 in accordance with the present subject matter. Basic functionality of an exemplary such meter data management system 100 is presented in FIG. 1, with discussion of more detailed exemplary aspects thereof provided in FIG. 2. FIG. 3 describes still further exemplary aspects of present meter data management system features, including operational and data analysis features.

Referring now to FIG. 1, meter data management system 100 generally corresponds to one or more application servers 110 and one or more database servers 112. Although both such servers are represented in FIG. 1 as single components, such depiction is for ease and clarity of illustration. As mentioned above, one of ordinary skill in the art will realize that a plurality of servers may be dedicated to the processing of various functions described herein. The application server(s) 110 may respectively include one or more of a plurality of dedicated components, such as but not limited to a network interface 114, memory/media elements 116, 118, 120, 122, and one or more processor(s) 124a, 124b. The application server(s) 110 are preferably coupled to an exemplary network 126 over which meter data is communicated from a plurality of external devices (e.g., meters 130a, 130b, meter bank/channel 132, data repository 134, service points, endpoints, cell relays, collection engines, and/or others).

It will be understood from the disclosure herewith that formatted data files are ultimately provided from the application server(s) 110 to a database server(s) 112. It should be appreciated that the import and storage functionality within database server(s) 112 may actually be part of the application server(s) 110 in one example, or located in a physically separate system in another example.

Meter data that is collected for management by the subject meter data management system 100 may be provided from a plurality of different external devices. In accordance with the discussion herein, external devices may correspond to devices that actually monitor consumed or distributed utility commodities (e.g., utility meters 130a, 130b as represented in FIG. 1), collections of such meter devices (e.g., a meter bank or channel 132 as represented in FIG. 1), or some sort of intermediary data repositories 134 communicatively coupled to meters or groupings thereof to receive meter data in a centralized hub location. It should be appreciated that the actual number of metrology devices from which meter data is collected is often very large, sometimes corresponding to hundreds of thousands of meters, data repositories, or other external devices. Accordingly, such large numbers of devices are representatively illustrated here only.

Figure 2:
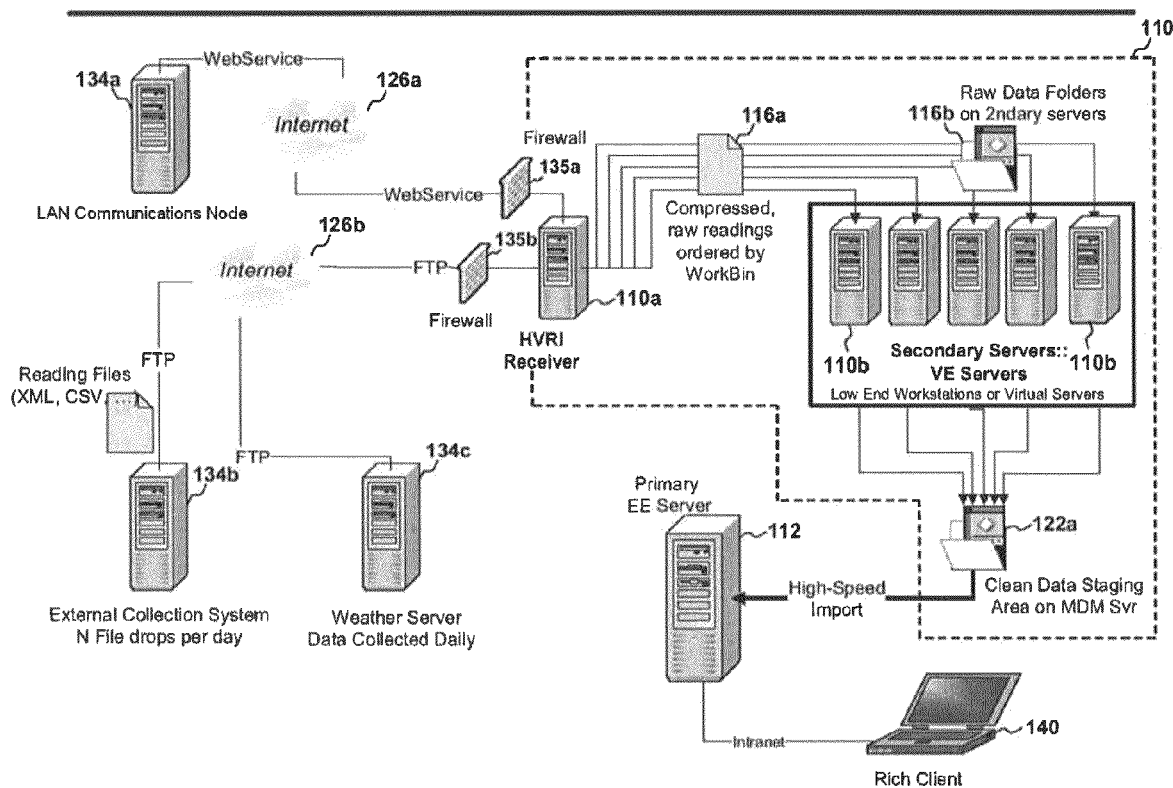
FIG. 2 is a more particular block diagram illustration of exemplary hardware components within a meter data management system of the presently disclosed technology, with provision of separate processing subsystems associated with respectively receiving data, validating and estimating data, and importing data.
Figure 3:
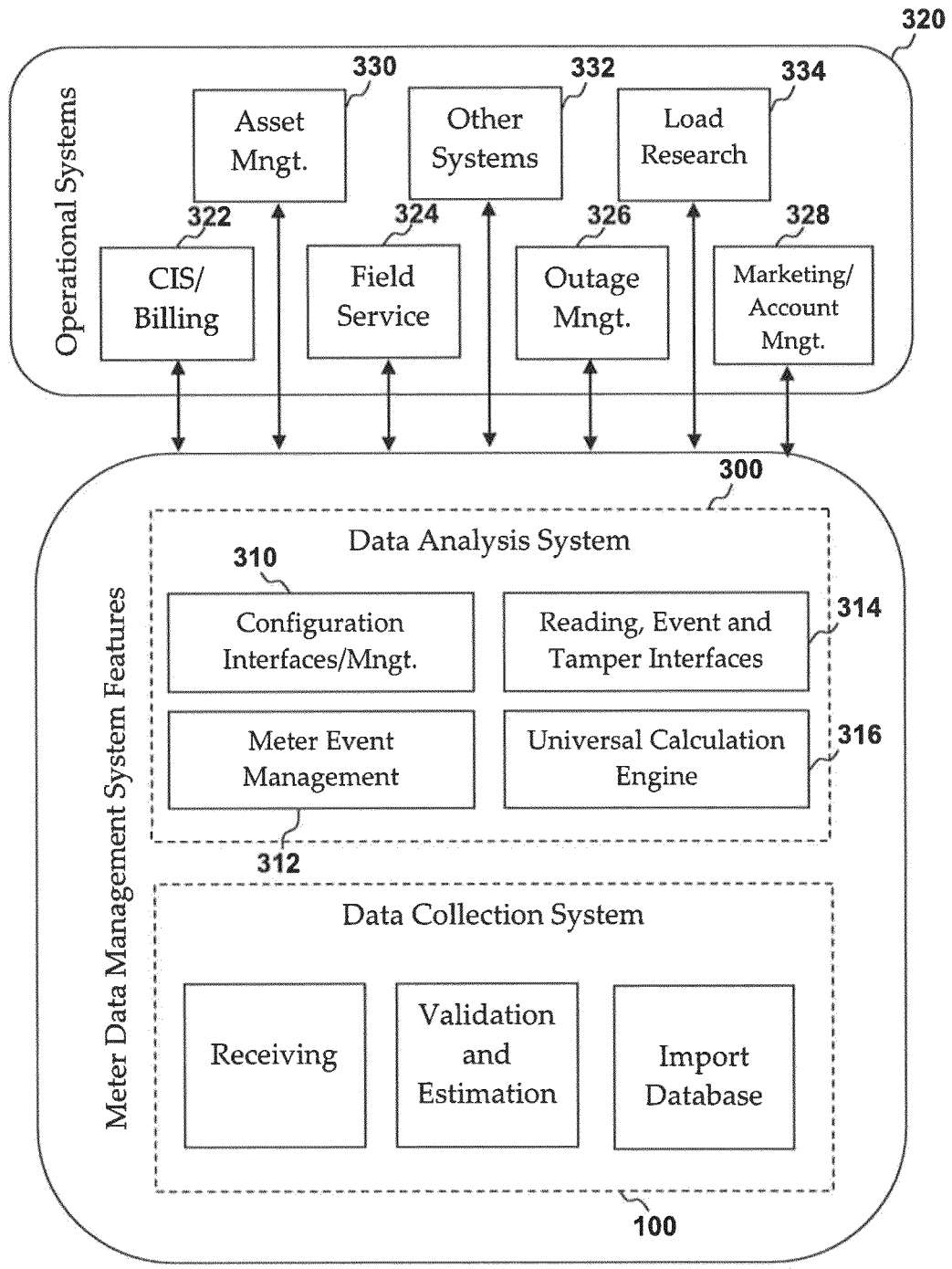
FIG. 3 provides a high-level overview of additional system features with which the subject meter data management technology may be implemented, including interfaced operational and data analysis features.

In FIG. 2, specific examples of intermediary data repositories for collecting meter data are provided. A first example corresponds to a communications node 134a that is predetermined as a collection point for receiving data from meters or meter banks in a local area network (LAN). A non-limiting and non-exclusive example of such a LAN environment corresponds to the OpenWay™ network architecture such as implemented by Itron, Inc. of Spokane, Wash., owner of the presently disclosed subject matter. LAN data communications to the communications node 134a may occur in a variety of forms, including but not limited to radio frequency (RF) transmissions (e.g. in accordance with cellular, Bluetooth, Zigbee, or other RF protocols), power line carrier (PLC), broadband over powerline (BPL), or public-switched telephone network (PSTN), as well other public, private, and wireless IP-based communication networks operating as standalone networks or in combination with other networks. Another exemplary potential data repository depicted in FIG. 2 corresponds to an external collection system 134b which is another centralized data hub configured for receiving N file drops per day from communicatively coupled meters, meter banks/channels, or other devices. Still further, separate servers, such as a weather server 134c, may be configured to provide weather data collected on a daily basis, which may subsequently be used to help in validation and other analyses of received meter data.

Data from the various external devices discussed with reference to FIGS. 1 and 2 are communicated over a network 126 (e.g., Internet components 126a and 126b in FIG. 2) to the data management system 100 of the present subject matter. Network 126 may correspond to a dial-in network, a local area network (LAN), wide area network (WAN), public switched telephone network (PSTN), the Internet, intranet or ethernet type networks and others over any combination of hard-wired or wireless communication links. In the example depicted in FIG. 2, meter data collected at the data node 134a is transmitted in accordance with a synchronized Web Service Application Programming Interface (API) format. In one example, such an API may be provided to synchronize the meter data with external systems that are the owners of the meter data, so that all data identifying a customer, account, service point, meter and module identifiers, consumption data, etc. can be provided in a uniform format regardless of the utility provider or meter source. Meter data provided from other data nodes 134b, 134c are transmitted via network protocols such as FTP (File Transfer Protocol), IP (Internet Protocol) or other known (or later developed) formats over network 126.

The communicated meter data obtained from the plurality of external devices is ultimately provided to the meter data management system 100 of the present technology. Initial data communications interfaces may be provided as part of or as input peripherals connected to the data management system. For example, one or more firewalls 135 (135a, 135b of FIG. 2) may be provided as an integrated collection of security measures for protecting the meter data management system from undesirable data or executable programs that could negatively affect the system performance of meter data management system 100. A network interface 114 (shown in FIG. 1) may also be provided to buffer or otherwise handle the actual relay of such communicated data as it is sent or received over a network 26. Files may be provided in a general-purpose format, such as XML files 115 (as represented in FIG. 1) or in accordance with other markup languages or other suitable file formats.

The interaction of data among the various hardware components of application server(s) 110 and database server(s) 112 will now be discussed. As previously mentioned, application server(s) 110 may include one or more processors and memory elements configured to perform a variety of computer-implemented functions (i.e., software-based data services). In FIG. 2, such application server(s) are provided as several distinct server components, including a receiver server 110a (note that HVRI as used herein means High Volume Reading Importer) and multiple secondary VE (Validation and Estimation) Servers 110b, such as low end workstations, virtual servers or other comparable systems. FIG. 1, however, performs all functions of receiving, validation and estimation in a single server component. Any combination of devices may be used, as long as it is appreciated that such server elements will generally include one or more memory/media elements, including some such memory/media elements (e.g., element 120 in FIG. 1) dedicated to storing software and/or firmware in the form of computer-readable and executable instructions that will be implemented by one or more processors. Other memory/media elements (e.g., elements 116, 118 and 122 of FIG. 1) are used to store data which will also be accessible by the processor(s) 124a, 124b and which will be acted on per the software instructions stored in memory/media element 120. The various memory/media elements of FIG. 1 may be provided as a variety of computer-readable medium, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.).

Memory/media element 116 of FIG. 1, which stores received meter data, may correspond in one example to data represented as the compressed, raw readings 116a depicted in FIG. 2. When separate Receiver servers 110a and VE servers 110b are provided as shown in FIG. 2, an additional memory/media element 116b may be provided at the VE server location to store raw data folders. The meter data stored at locations 116 (e.g., 116a, 116b) may be XML files, and may include information identifying the meter data in terms of a plurality of unique identifiers. For example, each item of raw meter data may include metadata such as a unique identifier (ExtSysDeviceID) for the external device (meter, data repository, etc.) from which the data was received. Such data may be subsequently transformed by the subject meter data management system 100 to include additional information, such as a NodeID, workbin designation, one or more timing parameters, etc., as is otherwise discussed herein in greater detail. This initial data transformation is generally performed by one or more processors 124a. The resulting files which include a workbin and other optional identifiers are generally depicted as workbin files 121 in FIG. 1.

Memory/media element 118 of FIG. 1 may include a collection of additional meter data, including prior readings, validation and estimation rules, weather parameters, and other information such as preassembled metadata needed to parse, validate and/or estimate incoming data. Memory/media elements 118 can be pre-assembled from various databases in an efficient and asynchronous manner to be organized according to workbin and timing parameters to minimize database roundtrips and to leverage native database processing power. In one particular example, memory/media element 118 includes historic data for the various meters whose readings are analyzed by the application servers 110. Such historic data may include relevant consumption information for prior periods of time so that current meter readings can be compared to such historic data for validation and, if needed, estimation. The validation and estimation functions are performed by one or more processors 124b, which execute software instructions stored in memory/media element 120 to perform comparative analysis of data within workbin files 121 to historic data stored in memory/media element 118. Historic data stored in memory/media element 118 may be uploaded from an external location, for example from a database 125 located within database server 112 as shown in FIG. 1. In addition, such historic data may be uploaded in identified portions at a time, for example, by workbin, so that more efficient data processing can occur at the application servers 110.

Memory/media element 122 provides a location for temporary storage of the binary files that are created by the subject meter data management system 100, namely such binary files that have been validated and that include estimated data where needed. Such binary files provided in memory/media element 122 are indicated as ready to import, at which point they may be automatically imported as soon as available to a separate database server(s) 112. Such files are indicated in FIG. 1 as clean binary files 123, where so-called clean files generally refer to binary files having all validated and estimated (if needed) data. Once written to the database server(s) 112, the clean binary files 123 are imported into a database 125, at which point the high volume importing aspect of the subject system will be completed. Similar to application server(s) 110, it should be appreciated that database server(s) 112 may also include one or more processors configured to execute a system of software that stores information in database 125 (or other memory/media elements) in a systematic way. It should be appreciated that once such data is imported in a coordinated and efficient manner per the present subject matter, subsequent processing and analysis of such data may still occur as desired by a given client 140, for example via the additional features discussed with reference to FIG. 3.

In one embodiment, the features illustrated and described with reference to FIGS. 1 and 2 are only part of a more comprehensive meter data management system. For example, in FIG. 3, aspects of the above system 100, including receiving, validation and estimation, and importing into dedicated databases, is a subset referred to as the data collection system feature within a more comprehensive data management system. Additional system features are also provided in a data analysis system 300, which may include such features as a configuration interface and management module 310, a meter event management module 312, a reading, event and tamper interfaces module 314 and a universal calculation engine module 316. It should be appreciated that each of the above modules may be implemented on one or more similar separate or the same servers such as already described with reference to the data collection features 100 of a meter data management system.

The universal calculation engine (UCE) module 316 in FIG. 3 may be generally configured to provide advanced calculation capabilities throughout the data management system and is used for time-of-use (TOU) and critical-peak-pricing (CPP) billing determinant creation, aggregation, unit and interval conversion, and the calculations on all reports and exports. In one embodiment, the UCE module 316 provides spreadsheet-like functionality for complex aggregation calculations and eliminates the need for custom coding each time a new calculation is required, reducing both implementation cost and implementation risk. Using the same UCE code base for all calculations ensures that the same results will be produced in all reports, exports, and interfaces throughout the system. To ensure that the UCE is not a processing bottleneck, the system may launch multiple instances of the UCE simultaneously, as required.

In one exemplary embodiment, the calculation functions of UCE module 316 support a utility's billing determinant calculations. For TOU billing determinants, any number of TOU bins can be defined, and more complex TOU algorithms involving base loads, on-the-fly critical peak periods, etc., can be defined by users without any custom development. Functions supported by the UCE include but are not limited to: Standard mathematical operators (e.g., +, −, *, /, square root, sine, cosine, etc.), unit conversion functions (e.g., KWH, KVARH→KVAH or power factor, V2H→V, etc.), conditional and logical operators (e.g., IF/AND/OR/NOT, <,>, etc.), multiple levels of nesting, interval status functions (e.g., conditional functions based on status, read statuses, write statuses, and the like), data and time functions (e.g., data and time evaluations, TOU functions, date and time offsets, etc.)

In one particular example of the present technology, event management module 312 may provide the ability to receive, store, filter, normalize, and transfer event data returned from meter reading systems. Event types include power loss, power restore, tamper, tilt, low battery alarms, etc. It should be appreciated that each meter reading technology and each meter type in a multi-vendor collection system environment may utilize a different coding system for events. One system might return a literal ASCII message "power off" when an outage occurs; another might return a code like 30 or H3; and another might return some abbreviation like PO. Event management module 312 may be configured to provide a standardization of these messages in its XML interface so that an upstream outage management system receives the same message for "power off" or "power on" regardless of which meter reading system returned it.

In one embodiment, event management module 312 may also provide event filtering. An outage management system generally wants to receive only relevant event types, such as power off and power on, and only if the message is not older than some predefined time period. A message just downloaded from the event buffer in a large industrial meter that the power was off two weeks ago, for example, is typically not relevant to the outage management system. Event reporting for a given meter can also be filtered temporarily during meter maintenance so that false outages are not transferred to outage management. Event filters may be preconfigured based on one or more of the following events parameters: event time (e.g., age of event), event type(s), list of meters, temporary block for maintenance, and others (including later developed or determined parameters). The automated transfer of events to upstream outage management systems can be triggered based on an event arriving and passing the filter criteria. Events may be transferred in a standard XML format, or other suitable file type.

Interface modules 310 and 314 are generally provided to selectively buffer, relay and/or transform data between other systems, such as a user interface that allows customers to interact with, troubleshoot or customize aspects of the meter data management system, output devices allowing for screenshots or report printing of meter data, meter events (outages, readings, etc.) and tamper indications. Analytic and operational reporting systems may be particularly advantageous to provide useful output indicia to a customer, user etc. For example, such interfaced reporting systems can provide operational and performance reporting across all meter reading technologies. It may be possible to track which meters must be read by each collection system and the progress of these collection systems as they deliver readings within the meter reading window. Additional reports may be generated to examine the quantity and quality of data that has been collected. Data graphs and reports may be provided for all meters, metered and calculated meter channels, and the like. In addition, calculations can be specified at the time of producing graphs and most reports, and the graph or report will calculate the result on-the-fly and display the result.

Exemplary operational and analytic reports and graphs available through the user interface may include but are not limited to the following: Detail interval data graphs and tabular reports by day, week, month, or specified time range with one or many channels in the same graph or report; Peak day graphs and tabular reports by day, week, month, or specified time range; Summary graphs and reports by day, week, month, etc., with peaks, lows, totals, etc.; Dedicated KVA/power factor graphs and reports for metered and calculated power triangle quantities; Coincident and non-coincident peaks report; TOU report for calculated TOU quantities by meter over specified time periods; Reading Detail Report showing most recent reads collected for each meter; Readings by Source report indicating how many reads arrived from each collection system source; Usage for Inactive/Disconnected Premises report; Zero Usage at Active Premises report; Data Available Report showing the time period over which data is available for each service point; Missed Readings Report listing meters that did not receive their full complement of readings each day; Gap Report identifying gaps within interval data streams; Readings Not Processed report to indicate if any synchronization failures have occurred; Open Work Summary report to track progress of collection systems in providing billable readings during the reading window; and Force Complete Report listing meters that did not have satisfactory readings to be provided to billing.

All graphs and reports can be viewed in the user interfaces, saved into spreadsheets, saved as electronic files, and/or saved as images for use in external reports, etc. Many reports can be run in batch mode. Graphs provide zoom in and zoom out functionality and provide mouse-over display of data points within the graph. Custom reports and graphs can be configured using the XML data export and third-party style sheets or reporting tools. In addition, custom queries can be run to fill in for areas where standard reports are not available. Queries may also be run directly against the database using dedicated system features available in the meter data management system of FIG. 3.

Referring still to FIG. 3, additional operational systems may also be interfaced to the subject meter data management system. For example, modules may be provided to implement processing functionality in accordance with areas as identified in the "Operational Systems" portion 320 of FIG. 3. Exemplary operational systems modules may include, but are not limited to a CIS (Customer Information System) and Billing module 322, a field service module 324, an outage management module 326, a marketing and account management module 328, an asset management module 330, a load research module 334, and other systems 332.

Referring to FIGS. 4-8, additional description is presented regarding the various processing steps that are implemented by the above hardware components in accordance with a method of managing meter data associated with a plurality of external devices.

As already described, the various steps and functions implemented in accordance with the present technology may occur at one or more separate processing locations. In general, certain of the process steps described herein are referred to in terms of three groups of functions, including: (1) Receiving Service Functions; (2) Validation and Estimation (VE) Service Functions; and (3) Database Import Functions. In general, in accordance with present subject matter, such three groups of functions act in an asynchronous and independent manner, processing each file from one service step to the next as soon as it is detected. The overall process is throttled only by a processing window, or predetermined period of time during which the VE Service functions, including fetching historic data as well as validating and, if needed estimating presently received data by comparison to historic data, are effected. In one example, a processing window corresponds to a period of a few hours typically between midnight and the beginning of the next business day as determined by each respective workbin. When workbins correspond to different time zones, overall system efficiency can be particularly increased by focusing processing efforts on a given workbin at a point when that workbin's processing window opens. It should be appreciated that such groupings of steps and functionality should not be unnecessarily limiting to the present technology, especially since such steps can be performed in a variety of locations or orders as is otherwise further described herein.

Figure 4:
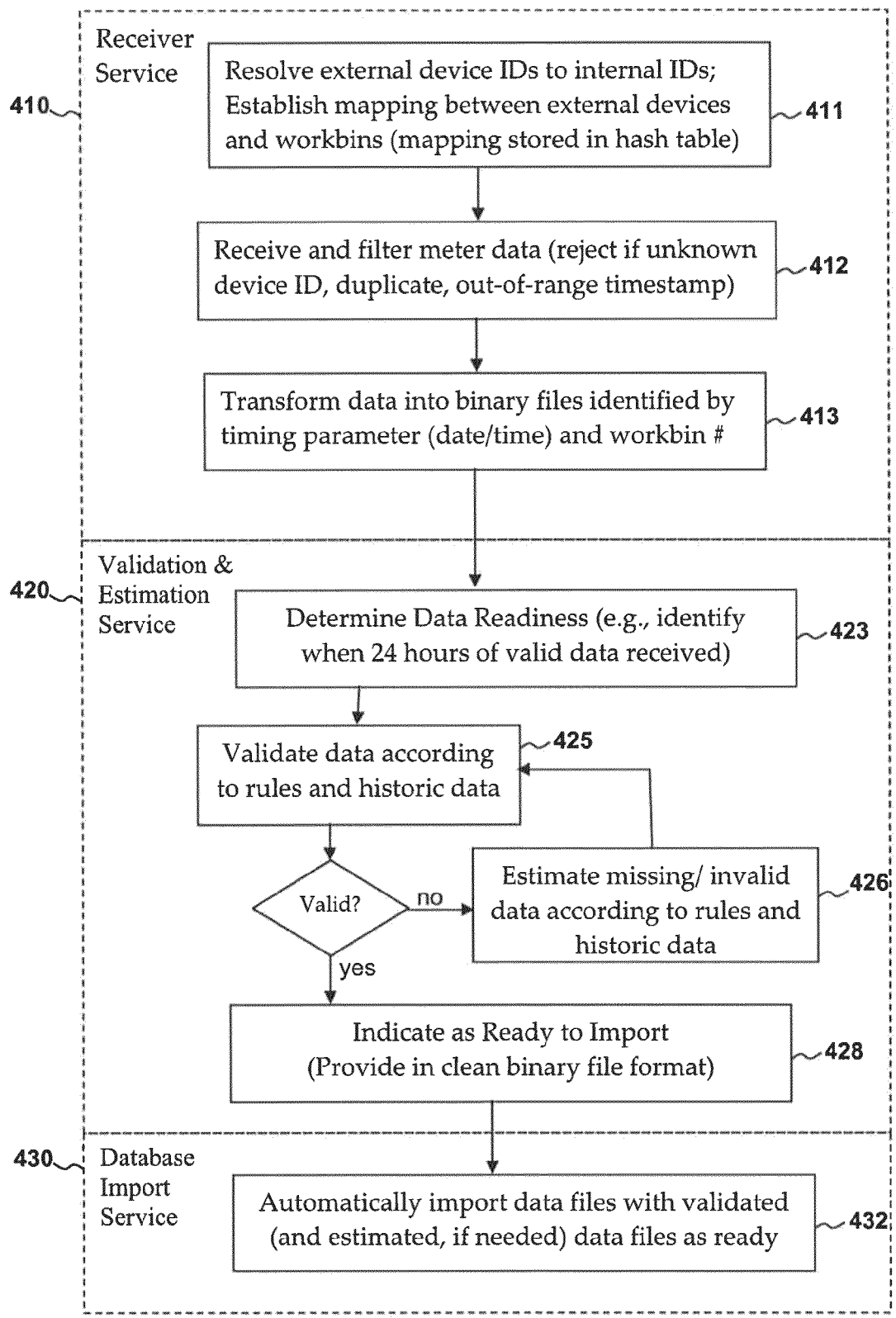
FIG. 4 provides a flow chart of an exemplary data management process in accordance with one embodiment of the present subject matter.
Figure 5:
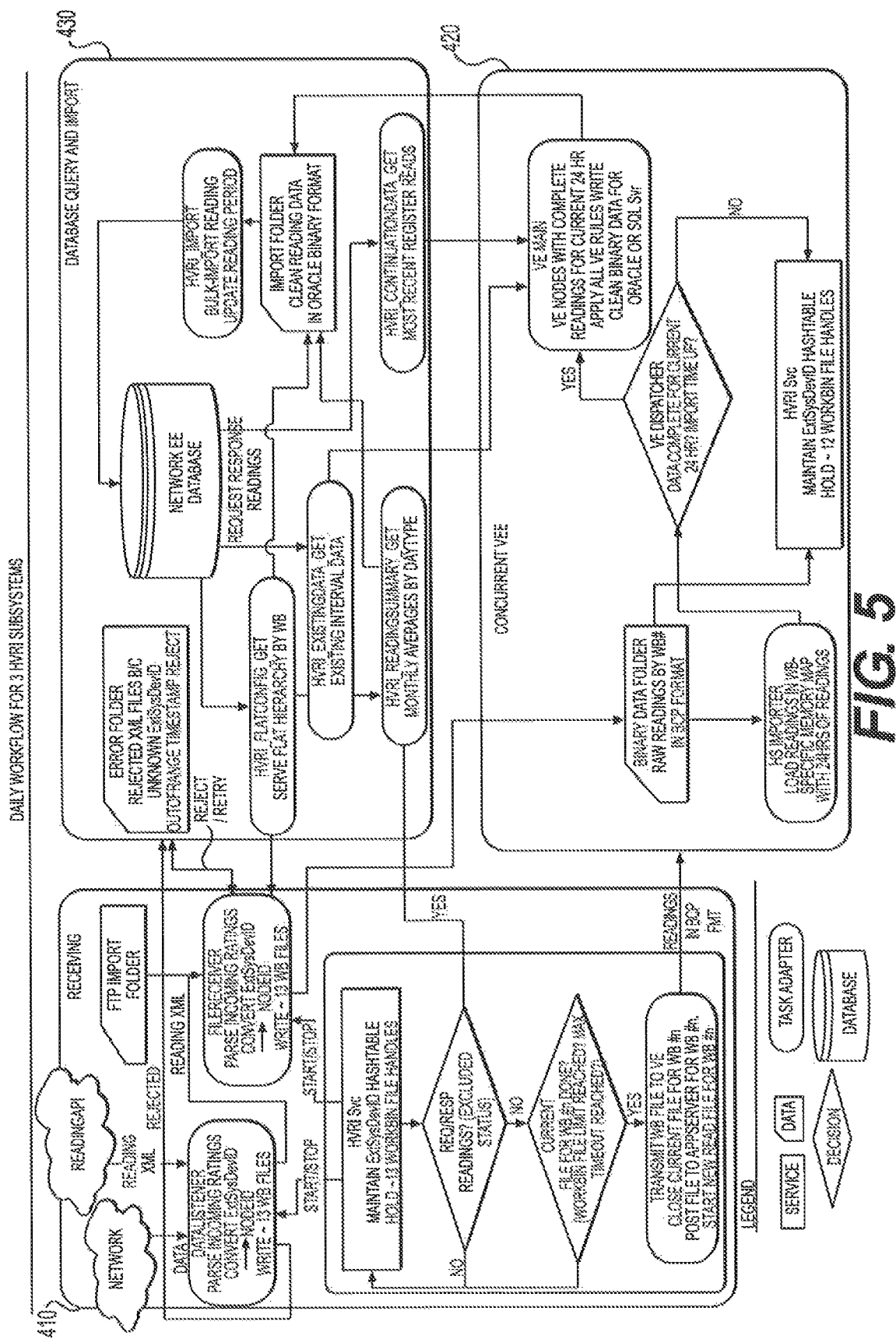
FIG. 5 provides a more detailed flowchart of the exemplary data management process set forth and selectively illustrated in FIG. 4, including the interaction among three related services, namely a receiving service, a concurrent VEE (validation, editing and estimation) service, and a database query and import service.
Figure 6:
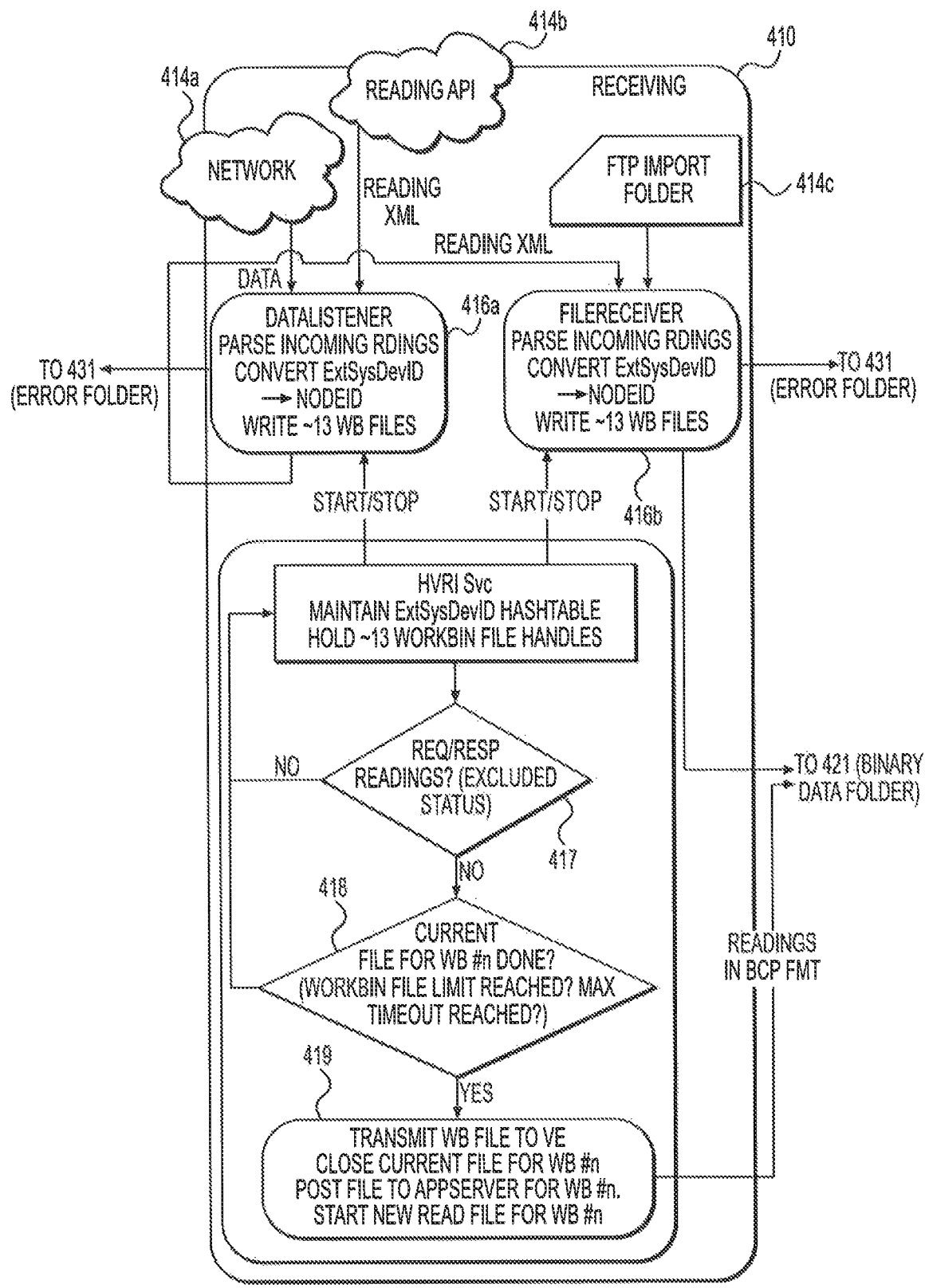
FIG. 6 provides an enlarged (or magnified) representation of an exemplary receiving service portion of the data management process flow chart from FIG. 5.
Figure 7:
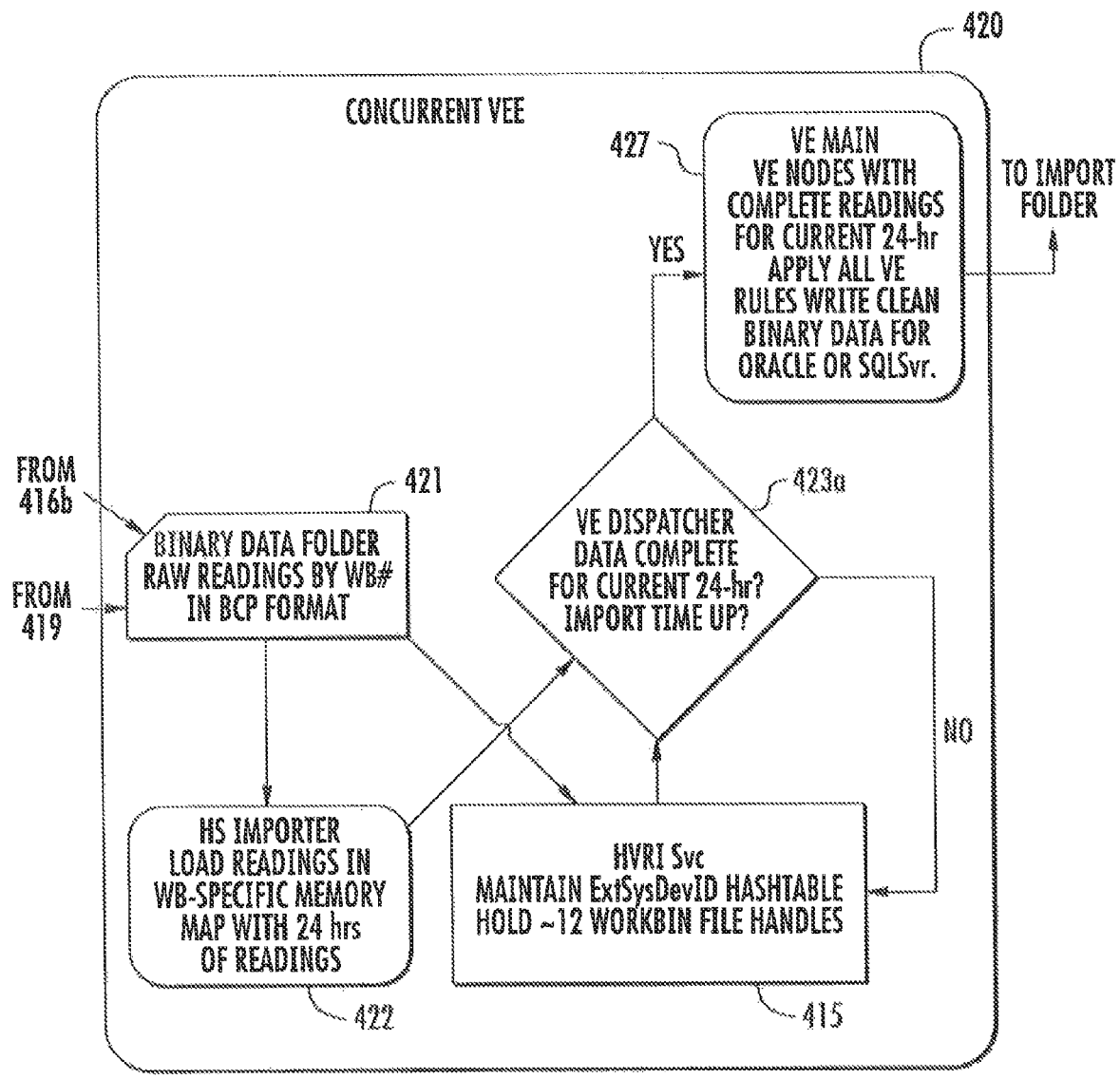
FIG. 7 provides an enlarged (or magnified) representation of an exemplary concurrent VEE service portion of the data management process flow chart from FIG. 5.
Figure 8:
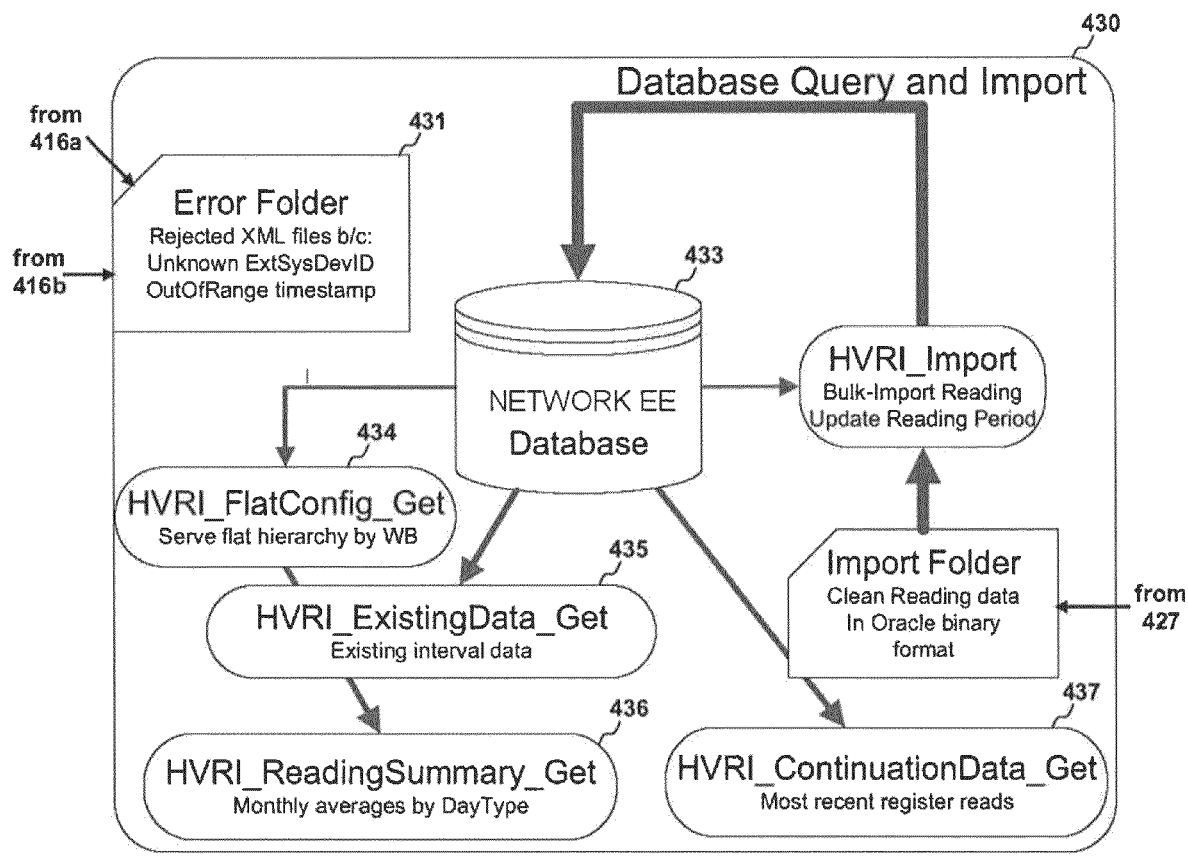
FIG. 8 provides an enlarged (or magnified) representation of an exemplary database query and import service portion of the data management process flow chart from FIG. 5.

FIG. 4 provides a general flow chart of exemplary steps in an exemplary meter data management method in accordance with present subject matter, while FIG. 5 provides a more detailed flow chart of related process steps and functions. FIGS. 6-8, respectively, illustrate one of the three sections of steps depicted in FIG. 5, namely steps respectively implemented as part of a receiving service (FIG. 6), a validation and estimation service (FIG. 7) and a database query and import service (FIG. 8). For ease of illustration, the magnified views of FIGS. 6-8 will include reference numerals, while FIG. 5 more generally depicts the overall interconnection among these three detailed aspects.

In general, a first group of steps in the subject electronic meter data management system are part of a receiver service 410. A first general exemplary function of receiver service 410 in accordance with the present subject matter is to establish a mapping in step 411 between each of the external devices which are relaying meter data to the subject meter data management system. Such an exemplary mapping may correlate external device identifiers to one or more new identifiers (which provide a direction for subsequent relay). New identifiers may be configured to indicate several parameters, such as but not limited to a workbin identifier. A workbin for purposes of present subject matter in present exemplary embodiments may correspond to a preconfigured grouping of external devices. As such, many different workbins may be identified into which received meter data may be sorted.

In one present exemplary embodiment, different workbins may correspond to different collections of meter channels. In one example, such collections are configured based on groupings of meters that are provided within a range of physical or geographic proximity to one another. For example, all meters or meter channels within the same time zone may be designated for assignment to a given workbin (or set of workbins).

In general, for present exemplary embodiments, the further organization of meter channels into large workbins, which are processed in such collective groupings, helps yield an efficient and asynchronous manner of processing, whereby database roundtrips can be minimized and native database processing power can be leveraged. Each workbin may thus preferably be configured to process data received from up to many thousands or millions or meters, corresponding to up to hundreds or thousands or more workbin files for each workbin. Processing by workbin may include such later discussed features as fetching historic data and implementation of validation and estimation, if needed.

A second general exemplary function of receiver service 410 is to receive and filter meter data at step 412. Meter data is received from a plurality of external devices (such as previously described with reference to FIG. 1, for example, including meters or data repositories and the like). Such raw data is generally depicted as XML reading files 115 in FIG. 1. The data is monitored in a filtering step to analyze initial characteristics, such as whether the data has come from an external device having a valid unique identifier or whether the data has an appropriate reading timestamp. For example, it may be desirable in a given processing window, such as a 24-hour time period, to accept data read only on the day before the current day (or the current day) and to reject meter data received with older timestamps.

Another general step 413 involves transforming the received data into a plurality of data files, wherein each data file is identified by workbin and at least one timing parameter (e.g., a timestamp) associated with the date on which selected portions of the meter data were read by an external device. These data files transformed by the receiver service 410 are generally represented as workbin files 121 in FIG. 1.

Additional details of the receiver service 410 are discussed with reference to FIG. 6. As indicated in such figure, meter data may be received in a variety of exemplary different formats. In one form 414a, data may already be provided in a proprietary format, one non-limiting example of which may be in accordance with Itron, Inc.'s OpenWay™ network infrastructure and associated communications protocol. In another form 414b, data may be read as XML data files. In yet another form 414c, data may be provided as files from an FTP import folder.

The receiver service 410 preferably is generally configured to be online at all times (i.e., operating twenty-four hours a day, seven days a week) to preferably provide a continuous data stream from the external devices. One or more conversion modules (e.g., DataListener module 416a, FileReceiver module 416b) may be provided to parse incoming meter readings and to convert each external device identifier (ExtSysDeviceID) into one or more new identifiers, such as a NodeID, which provide a synchronized ability to identify each received meter reading to a new communications processing route. In some embodiments, the external device identifiers (e.g., ExtSysDeviceID) are used by a utility company to uniquely identify a meter channel, while in the subject meter data management system 100 the same meter channel is referred to by a unique NodeID. In both contexts, there is general information relating to basic meter characteristics such as meter factor, form, channel, etc. which is associated with the external or internal device identifier.

Initially, preferably filtering may also occur at steps 416a, 416b to distinguish between readings received with timestamps as expected (e.g., the day before the current day) and older timestamps (for late-arriving readings or corrective readings). Received data that includes an unknown external device identifier, an out-of-range timestamp, and/or a duplicate reading may be rejected, formed into an appropriate error file and sent to an error folder (represented by element 431 in present FIG. 8).

The data transformation step 413 of FIG. 4 may in part include conversion implemented at steps 416a, 416b, which may involve assigning each incoming reading to one of many previously established workbins (for example, each represented by an identifier such as a WorkbinNumber). In one present example, a plurality of different workbins may be established, such as in a range of from three to twenty workbins. The step of assigning each meter data reading to an appropriate workbin may be implemented in part by the provision of an in-memory Hash table 415, as identified in FIG. 7. In one example, internal identifiers (e.g., assigned NodeIDs) are correlated to workbin numbers in the Hash table 415. In another example, such data table may be preferably provided in close processing proximity to the data converter for fast conversion of identifiers and assignment of workbin numbers.

Per exemplary present steps 417 and 418, additional monitoring of the current workfile may be performed in each workbin, to determine if a user-definable file size is reached or if a user-definable time-out is reached. A non-limiting example of a user-definable file size corresponds to one in a range of about 10-30 megabytes. If such parameters are determined to exist, then the file has reached an optimal point where it is ready to be transmitted to the VE Service component 420 of the subject meter data management system and process. Data may then be compressed into binary files separated by workbin and by one or more timing parameters, such as a timestamp indicating date of meter reading. As mentioned, the data may preferably be limited to an optimal file size. An example of a suitable binary file format corresponds to Bulk Copy Program (BCP) format, which can be used to either import or export data from a Structured Query Language (SQL) Database.

Referring to present exemplary FIGS. 4 and 7, after meter data readings have been received, filtered and transformed (including being mapped to a workbin) by the functions implemented in receiver service 410, they are provided in binary file format to VE (Validation and Estimation) Service 420. In one present exemplary embodiment, at least one processor is dedicated to the VE services for each different workbin preconfigured in exemplary hash table 420. In one present exemplary embodiment, VE services are only active during a limited processing window. For example, one processing window might be configured to begin after the most recent day's data has been received and ending before the customer's business day starts, although it should be appreciated that a non-continuous processing window may be defined to include any range of dates and/or times. In an example where VE services are performed during a dedicated processing window, resources may be conserved by leaving the processor elements dedicated to the VE services as inactive during that time. Alternatively, they can be dedicated to performing tasks associated with other non-VE services (e.g., receiving, importing, etc.). An exception for VE services being performed during the processing window may be made in certain instances, for example, upon receiving out-of-cycle data for historic dates that are before the most recent day. Such late readings may be processed when received instead of waiting for the processing window.

In FIG. 7, the representative binary data folder 421 includes all files received from the receiver service 410. Such files are loaded into the HS Importer module 422, which may be a cache memory or other dedicated memory/media device. Data readings are loaded and sorted by both workbin number and timing parameter (e.g., timestamp including data and time) so that a determination can be made at step 423a (in FIG. 7) as to whether all data for one day has been received and found valid for one or more meter channels. Such a data readiness determination is generally depicted in FIG. 4 as step 423. If twenty-four (24) hours of data (or other desired time block—e.g, eight (8) hours, twelve (12) hours, forty-eight (48) hours, etc.) are present, then such data can proceed to subsequent validation and estimation steps 425 and 426, as shown in FIG. 4.

It should be appreciated though that the order of data readiness determination, validation and estimation may be changed in other embodiments. For example, data may be validated (and estimated if needed) in-memory as it is imported from the receiver service. In general, when the predetermined processing window defined by the VE service closes, data proceeds to node 427 for validation and optional estimation. Meter channels with incomplete data or with invalid data received for the expected, most recent day are estimated, and the missing or invalid data is replaced with estimates. Data with timestamps older than expected (i.e., older than the most recent business day) may be estimated as soon as any validation check fails.

Per further exemplary aspects of the validation step 425 and estimation step 426 of FIG. 4, it should be appreciated that validation and estimation steps may be implemented in accordance with a variety of preconfigured rules stored for implementation by one or more processors associated with the VE service 420. Validation and estimation process steps may correspond to parameter-based validation and estimation algorithms, user-defined validation and estimation algorithms, and/or editing of individual values and statuses of read values by using a user interface. In some embodiments, validation and estimation involves comparing received meter data to historic data, such as similar consumption data from comparable prior periods of times (e.g., like hours and days during the last week, last month, last year, etc.) In one embodiment, such historic data is uploaded at the start of each workbin's respective processing window so that the necessary historic data for a given workbin is available for more efficient processing. By performing such historic data fetching, data validation and estimation, if needed, based on coordinated groupings of data (i.e., by workbins), the subject process is streamlined. In addition, meter data that is validated and estimated by the VE service 420 may include metadata to identify which meters were validated and/or estimated, the reason for any estimate, and the original and estimated values.

With more particular reference to validation step 425, it should also be appreciated that either of parameter-based and/or user-defined validation rules may be implemented. With parameter-based validation rules, the validation rule may be predefined in the system and the user specifies only the value that the validation will check against.

Parameter-based validation rules may for example include: rules for filling in data gaps; rules for handing data overlap or multiple versions of data; rules for defining usage tolerance parameters, such as may apply to a comparison of registers to interval data, including but not limited to an acceptable percent differences, absolute differences, percent of multiplier differences, and the like; rules establishing a predetermined demand tolerance, involving similar comparisons of registers to interval data in one or more difference ranges; rules defining ranges of acceptable high and low usage limits, demand limits, power factor limits, load factor limits; rules defining a demand tolerance (in terms of percentage or other parameter) between consecutive data intervals; rules for setting a maximum and minimum number of permissible zero intervals in the meter data; rules for voltage spike tolerance levels; rules defining permissible timestamps, such as based on a comparison of meter time to system time; rules for implementing a load profile interval count check; rules for conducting a comparison of a channel's load against a reference channel's load; rules for conducting a comparison against a previously read period of meter data, including such parameters as the maximum demand percentage difference, maximum demand absolute difference, total usage percentage difference, total usage absolute difference, minimum power factor percentage difference, and/or load factor percentage difference.

With user-defined validation rules, a user may specify both the validation logic and the values to apply the logic against System behavior, upon failed validation, can be defined by the user down to the meter and channel or register level.

Referring still to the validation step 425 in FIG. 4, once data is validated by analytical comparison to historic data according to one or more of the exemplary rules as described above, such data can be indicated at step 428 as ready to import. If the data is invalid, it may be desirable per present subject matter to proceed to estimation step 426, where data can be estimated according to a different set of rules. Estimated data is then preferably revalidated at step 425 before being indicated as ready to import.

With more particular reference to exemplary step 426 of estimating data, it should be appreciated that data editing and estimation can be manually initiated through the user interface or configured to run automatically based on criteria such as failed validation or missing data being true. In accordance with present subject matter, automatic estimation may use parameter-based or user-defined estimation algorithms to define rules to be used with linear interpolation, historical, and load profile estimation methods. Similar to the validation step 425 described above, estimation step 426 may also involve comparison and correlation to historic data, such as known consumption data for prior periods of time, as uploaded by workbin to the validation and estimation servers.

Parameter-based manual estimation functions may include instructions to implement one or more of the following exemplary functions: Estimate interval data based on meter readings, Replace all values with constant value; Multiply or divide by a constant value; Add or subtract a constant value; Copy values from a reference channel or register, with or without scale value; Copy values from a previous time period; Perform linear interpolation; Slide a range of interval data ahead or back in time; Split or combine intervals; Set or reset one or more statuses; Restore previous version; and/or Delete data (mark as deleted).

Capabilities for direct editing of individual values on-screen include options for performing the following exemplary functions: Add or replace values manually on screen; Modify status manually on screen; Display and/or edit multiple channels on the same screen; and/or Copy or cut and paste a string of values and statuses from one channel to another.

In one particular present example, data estimation for missing or invalid data may be conducted by taking an hourly average of three like days from a time period in the past (e.g., the most recent year or the most recent quarter). Like days are considered days when consumption would be expected to have been on a comparable level. For example, data on missing business days would be estimated by comparison to data from business as opposed to non-business days.

With reference to both FIGS. 4 and 8, additional aspects of an Import Service 430 are discussed. In general, an exemplary database server 433 (of FIG. 8) is dedicated to perform import functionality at step 432 of FIG. 4 by importing data that is validated (and estimated, if needed) as it becomes available. Data import follows a so-called "hungry consumer" model in that it bulk-imports binary files of clean data produced by the VE service subsystem 420 as soon as such clean data files are produced. In one exemplary embodiment, clean imported files may contain multiple pieces of information, corresponding to separate files or portions of files: (i) a data file, containing the actual meter reading data; (ii) a header file, listing begin and end times of the data in the data file; and (iii) a status file, which may include an inventory of unique status values contained in the data file. In another particular present example, the file format of the clean imported files is an "Oracle binary" format or "SQL native format." The separation of (a) writing of clean data as binary files to the database server and (b) importation of such binary files to the database itself is another characteristic of the subject system that increases processing efficiency because the two steps are asynchronous. Prior systems often post clean data directly to the database in a synchronous process which, while appearing more direct, contributes to degrading performance at high volumes of data transfer In addition to basic importing, the database import service 430 may also update metadata that keeps track of certain parameters, such as but not limited to what meter readings have been received and when, what continuous records of data exist, and what XML import files have been processed. Metadata provided at point 434 may be provided back to the receiving service subsystem 410 in order to track and serve the established hierarchy of workbin designations, to help ensure that appropriate configuration of the different workbins is more properly maintained.

Representative task point 435 concerns updating existing interval data to determine what meter readings have been received and when, including what XML import files have been processed. Such information is then passed to a summary task 436, which maintains daily, weekly, monthly or other preselected data averages by day type (e.g., business day, peak usage day, etc.). Such estimates of average usage may be updated and maintained for a period of time (e.g., one year) so that appropriate information needed for validation and estimation is available to the VE service subsystem 420. In addition, most recent measured register values are updated at task point 437 to assist with determinations regarding what continuous records of data exist. Referring to FIG. 1, all such task points 435, 436, and 437 generally correspond to the collections of so-called historic data that are fetched by the VE processor(s) 124*b* within one or more of the application server(s) 110. This historic data may then be stored, for example, in memory/media element 118 for use by processor (s) 124*b* to validate (and estimate if needed) the current meter data based on comparative analysis to the historic data.

EXAMPLE AND RESULTS

A general goal of the subject meter data management system and related methodology is to accommodate high volume importing of data received from large numbers of external devices. As such, a test system has been implemented and analyzed to demonstrate that the subject system can support business requirements for validating, auto-estimating and importing up to 4.5 million half-hourly meters in just a few hours. Half-hourly meter are meters with a data channel that stores a consumption reading every 30 minutes, thus corresponding to a volume equivalent of hourly data for 9 million meters.

Several tests were run where XML import files containing readings data for a 24-hour test day were provided to the system. The format of the data matched the format to be expected from an AMI system. The data was parsed into intermediate files, then validated and if necessary, estimated. In the final step, the clean data was imported into the database. Over two hundred million intervals of data were imported in each test. The exemplary hardware configuration used in the testing included several VE servers (13 in one example, 3-4 in another), one (1) Receiver server and one (1) Database server. Of the various servers, a mix of Intel chip configurations and Xeon chip configurations were used, each with a respective plurality of dual-core processors.

In all scenarios, the entire population of metered data was tested against a comprehensive set of real-life validation rules, similar to those implemented in accordance with utility market requirements mandated on the state level (e.g, California) or national level (e.g., Australia). Such rules included validation definitions for the following parameters: Historical Maximum Demand Absolute Difference, Usage High Limit, Demand High Limit, Historical Total Usage Absolute Difference, Historical Total Usage Percent Difference, Usage Tolerance Percent Difference, Historical Maximum Demand Percent Difference, and Demand Low Limit. In addition, tests were conducted that varied the missing read percent from 0.0% missing to 5.0% missing, hence requiring as many as 11 million reads to be estimated.

Figure 9:
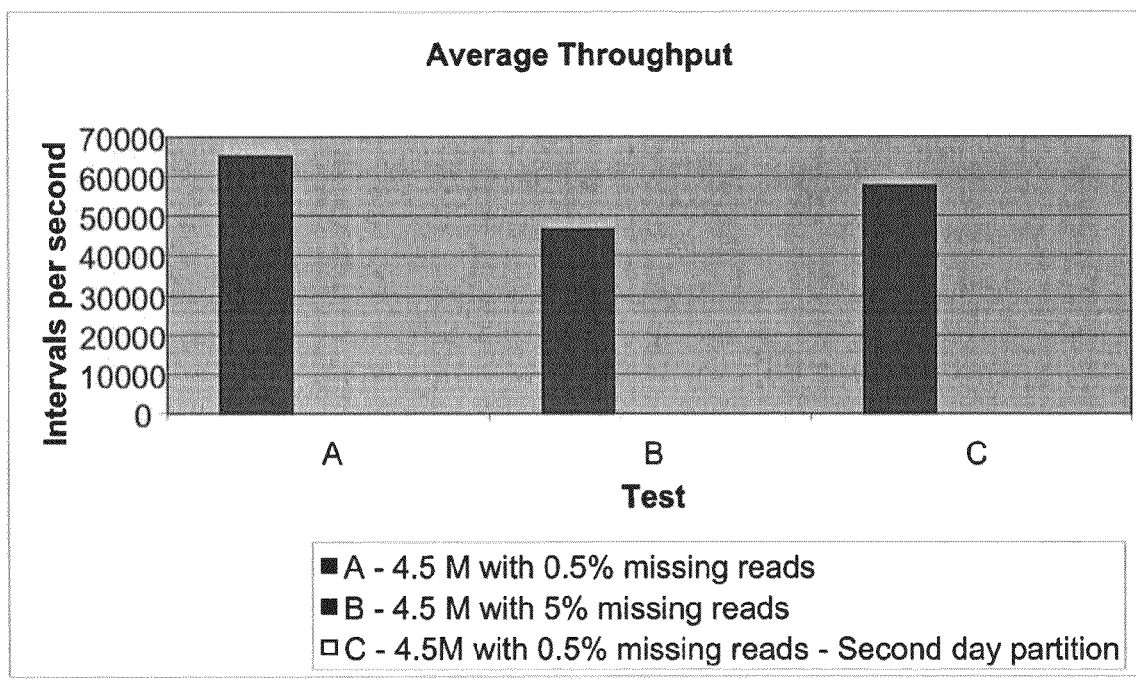
FIG. 9 provides average throughput test results for three exemplary different types of meter data management system simulations performed in accordance with the disclosed techniques.

The results of the benchmark tests demonstrated that the subject system can comfortably validate, auto-estimate, and import 4.5 million half-hourly, equivalent to 9 million hourly, meters in a processing window of under two hours. A throughput of 35,000 intervals per seconds and higher, including estimations for 0.5% of the meters, was consistently achieved. Such achievements represent an over 20% improvement in data capacity relative to other known import systems. In some instances of the tests, throughput of greater than about 85,000 intervals per second was achieved, and other instances fell in a range of between 35,000 and 85,000 intervals per second. The average throughputs for numerous iterations for three different categories of test results are provided in FIG. 9. A first category A of testing managed half-hourly meter data from 4.5 million meters with 0.5% missing reads. A second category B of testing managed the same volume of data with 5.0% missing reads. A third category C of testing managed the same volume of data with 0.5% missing reads, and utilizing second day data partitioning, thus confirming that data import performance may slightly decline as the weekly data partition fills with data.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for importing, validating, and estimating high volume meter data, the method comprising:
   receiving meter data from a plurality of external devices, each external device being assigned to one of a plurality of device groupings;
   sorting the meter data into a plurality of workbins respectively associated with the plurality of device groupings;
   compressing the meter data contained in each workbin into a plurality of data files, each data file being identifiable by workbin;
   importing, for one workbin at a time, all data files associated with such workbin;
   storing historic data associated with each workbin;
   validating the meter data contained within the data files against the historic data, by comparing such meter data with historic data from comparable prior periods of time during a plurality of processing windows;
   using stored historic data for a given workbin to estimate replacement values for meter data that is determined to be invalid or missing for such given workbin during the plurality of processing windows;

forming the validated and estimated meter data into a plurality of port files; and storing the plurality of import files;

wherein each processing window corresponds to one of the plurality of workbins such that all data files associated with a workbin are processed as a batch.

2. The method of claim 1, further comprising:

establishing a mapping between each of the plurality of external devices and the plurality of workbins, the mapping corresponding to a grouping of external devices provided within the same time zone.

3. The method of claim 1, further comprising:

identifying each data file by at least one timing parameter associated with the date on which the selected portions of meter data was read by an external device.

4. The method of claim 1, further comprising:

before validating the meter data, identifying data readiness corresponding to when all meter data corresponding to a predefined twenty-four hour period has been received from one or more groupings of external devices.

5. The method of claim 1, wherein receiving the meter data from the plurality of external devices includes receiving the meter data in XML format; and wherein compressing the meter data contained in each workbin into a plurality of data files includes forming compressed binary files.

6. The method of claim 1, further comprising revalidating estimated meter data that was previously found to be invalid before it is formed to import files.

7. The method of claim 1, further comprising:

characterizing each data file compressed by a predetermined file size, and monitoring the file size and population time for data files processed in each workbin to ensure file efficiency.

8. The method of claim 1, further comprising:

structuring each imported data file to provide metadata indicative of one or more factors selected from: an indication of what meter readings have been received based on external device identifiers, when each meter reading has been received based on one or more timing parameters, what continuous records of data exist for one or more external devices, what meter readings have been processed by said data management method, and historic data identifying prior consumption levels for selected external devices.

* * * * *